United States Patent [19]
Bernard et al.

[11] Patent Number: 5,988,807
[45] Date of Patent: *Nov. 23, 1999

[54] FLUORESCENT VALVE JET INK

[75] Inventors: Richard A Bernard, Norwalk, Conn.; Norman C Hochwalt, Dayton, Ohio; Judith Auslander, Westport; Jerome E. Jackson, Newtown, both of Conn.

[73] Assignee: Pitney Bowes Inc., Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/986,527

[22] Filed: Dec. 8, 1997

[51] Int. Cl.$^6$ ...................................... C09D 11/02
[52] U.S. Cl. ................... 347/100; 106/31.27; 106/31.32
[58] Field of Search ........................ 347/100, 10

[56] References Cited

U.S. PATENT DOCUMENTS

| | | | |
|---|---|---|---|
| 4,733,447 | 3/1988 | Ageishi | 29/157 C |
| 5,098,476 | 3/1992 | Baker | 106/22 |
| 5,106,417 | 4/1992 | Hauser et al. | 106/20 |
| 5,125,968 | 6/1992 | Takimoto et al. | 106/20 |
| 5,320,668 | 6/1994 | Shields et al. | 106/20 R |
| 5,521,619 | 5/1996 | Suzuki et al. | 347/10 |
| 5,580,372 | 12/1996 | Gino et al. | 106/20 R |
| 5,674,314 | 10/1997 | Auslander et al. | 106/21 A |
| 5,681,381 | 10/1997 | Auslander et al. | 106/21 A |

*Primary Examiner*—N. Le
*Assistant Examiner*—Christina Annick
*Attorney, Agent, or Firm*—Ronald Reichman; Melvin J. Scolnick

[57] ABSTRACT

A fluorescent ink that makes tagger marks and is able to be used in valve jet printers at a rate of four #10 envelopes per second. The ink also penetrates paper at a rapid rate and dries at the same time it is penetrating the paper, without degrading the print quality. The penetrating agent solvent system may be isopropyl alcohol in combination with a surfactant. The surfactant may be polyethylene glycol ethers. Polyethylene glycol ethers have a high boiling point and low vapor pressure. The penetrating agent solvent system has a low boiling point and high vapor pressure and a low static and dynamic surface tension. This improves the inks rate of penetration into the paper and diminishes the amount of offset.

19 Claims, No Drawings

FLUORESCENT VALVE JET INK

FIELD OF THE INVENTION

The invention relates generally to inks, and more particularly to inks that may be used in a valve jet printer.

BACKGROUND OF THE INVENTION

Valve jet printers are used in industrial applications for the printing of large characters and pictures onto cartons or other large items. Unlike other drop on demand ink jet systems, the design of using a valve to control the printer nozzle enables highly volatile solvents such as MEK (methyl ethyl ketone) to be used, since there is a reduced requirement to prevent drying at the nozzle. The reason for the above is that the valve jet is purged with a solution prior to extended shutdown periods. Valve jet printers have less complex technology than ink jet printers and are capable of printing larger volumes of material and more material area in a given time and are generally less expensive.

Red fluorescent inks have been used in postage meters or franking machines for imprinting postal indicia. Inks used for the printing of postal indicia in the United States have to be red fluorescent so that automatic sorting equipment may be used by the United States Postal Service. The excitation wave length at 254 nm of a typical red fluorescent ink while the emission radiation is in the range of 580–40 nm. The image obtained with the red fluorescent inks has to be permanent, i.e. good water fastness less than 0.07 optical density background change, good smear fastness and light fastness i.e., minimal change in L, a, b values. Also, the images on various substrates have to be resistant to mechanical abrasion and common office chemicals. An ink that does not dry out at extreme temperature (50° C.) is beneficial to the printing system. The ink that penetrates rapidly into different substrates and has minimal offset to overlapping envelopes is also beneficial to the printing system.

A facer canceller is a device for handling, authenticating and sorting randomly oriented letter mail. Facer cancellers check the top and bottom front and back of a mail piece to cancel the stamps thereon and determine if a postal indicia is present. Facer cancellers can also identify the presence or absence of a tagger mark on an envelope. A tagger mark may have any geometric shape as long as it supplies enough fluorescent intensity to be detected. The tagger mark containing fluorescence enables a facer canceller to read and orient the mail piece.

An ink jet printer is incapable of placing fluorescent tags on mail pieces at rates greater than or equal to four #10 mail pieces per second, while meeting all of the above requirements. A valve jet printer is capable of printing fluorescent tags on mail pieces at speeds equal to or greater than four #10 mail pieces per second. When current fluorescent inks are used in valve jet printers the ink bleeds when the printing surface is exposed to water. This creates a problem since water is used to seal the mail piece.

Another disadvantage of prior art fluorescent ink jet inks is that they are difficult to manufacture. The inks require high purity i.e., the insoluble salts contained in the dyes and toner of the fluorescent ink have to be lower than one part per billion is preferred. The reason for the above is that if the insoluble salts have a greater concentration than that specified above, there will be a residue build up on the nozzles of the ink jet printer, which will cause clogging of the nozzle.

Another problem of prior art fluorescent inks is that they do not give consistent print quality on a large variety of substrates. Tagger inks have to be used on a large variety of paper envelopes. The components of the paper can be inhibiting to the fluorescence intensity or can have adverse effects on the optical density of the prints. Therefore, there is a need for a tagger mark that will have consistent fluorescence and optical density on a large variety of envelopes, while interacting with the paper.

Another disadvantage of the prior art is that the dyes have to be purified to prevent coagulation in the nozzle or jets of printers. This causes erratic firing of the printer and degrades the life of the print head. Often times ions like sodium, chlorine, magnesium, and sulfates have to be removed to lower concentrations. Purification methods are expensive and time consuming.

SUMMARY OF THE INVENTION

This invention overcomes the disadvantages of the prior art by providing a fluorescent ink that makes tagger marks and is able to be used in valve jet printers at a rate of four #10 envelopes per second. The ink does not have to be purged from the valve jet during extended shutdown periods. The ink also penetrates paper at a rapid rate and dries at the same time it is penetrating the paper, without degrading the print quality. The penetrating agent solvent system may be isopropyl alcohol in combination with a surfactant. The surfactant may be polyethylene glycol ethers. Polyethylene glycol ethers have a high boiling point and low vapor pressure. The penetrating agent solvent system has a boiling point of 170° C. and 204° C. and high vapor pressure and a low static and high dynamic surface tension. This improves the inks rate of penetration into the paper and diminishes the amount of offset.

This invention uses a volatile penetrating agent solution that contains solvents that have a high vapor pressure at room temperature, i.e. isopropyl alcohol is a volatile penetrating agent. Volatile penetrating solutions have a high dynamic range surface tension (short time for surface aging) a high vapor pressure and a low effective surface tension which makes them superior wetting agents. The vapor pressure of Isopropyl Alcohol is 31.2 dynes/cm of mercury at 20° C. The dynamic surface tension is a measure of the surface aging time that it takes for the surface active molecules to migrate from the surface to the bulk. Surfactants below critical micelle concentration are not effective in the wetting process because it takes too long to migrate from the surface to the bulk. Isopropyl alcohol migrates almost instantaneously from the surface to the bulk making the dynamic surface tension almost equal to the static surface tension.

The ink may also be read by a facer canceller to orient the mail. This ink can be made from a simple formula containing materials that are readily available and do not require an expensive purification process of all of the ink components. Special equipment is also not required to manufacture the ink.

Another advantage of this ink is that the ink provides a fluorescent mark that peaks at 598 nm, which is within the detection capabilities of current facer cancellers.

An additional advantage of this ink is that it has good water fastness on paper. The good water fastness enables the ink to adhere to the paper while the paper is being exposed to the outside environment. This is particularly important when the ink is affixed to mail pieces that may become wet.

A further advantage of this ink is that the optical density and fluorescent intensity do not change significantly after being exposed to light.

Another advantage of this invention is that a valve jet printer is used in conjunction with an ink jet printer in the printing mechanism of a postage meter wherein the valve jet printer is printing tagger marks.

Another advantage of this invention is that an expensive and time consuming dye purification process is not required to purify the dyes that are used in the valve jet ink.

Another advantage of the ink of this invention is that the ink maintains its fluorescent intensity after being exposed to water.

A still further advantage of this invention is that the ink does not have a tendency to dry at the nozzle of valve jet printers.

DETAILED DESCRIPTION OF THE PREFERRED EMBODIMENT

The formulation of the ink of the instant invention provides fluorescent inks that are capable of being used in a valve jet printer.

Composition of the ink, in accordance with the invention, comprises:

The general composition of the ink is as follows:

| | INGREDIENT | (WT. %) |
|---|---|---|
| 1. | Clear resins and fluorescent toners | 1.3–6.0 |
| | a. dimethyl hydantoin formaldehyde polymer (Dantoin 739) by Lonza | |
| | b. fluorescent dimethyl hydantoin formaldehyde manufactured by Sun Chemical fluorescent magenta red toner | |
| 2. | Dyes | 0.18–1.1 |
| | a. Basonyl Red 560 (Basic Violet 11:1) | |
| | b. yellow dyes i.e. Basonyl Brilliant Yellow FF4048 (Basic Yellow 40), soluble in the solvent system may be used | |
| 3. | Water | 48–57 |
| 4. | Cosolvents or mixtures or individual solvents | 13.8–17.8 |
| | a. 2-pyrrolidinone | |
| | b. polyethylene glycol average molecular weight 200 | |
| | c. other solvents that will match the water like definition described herein | |
| 5. | Penetrants | 10.25–18.0 |
| | a. Triethylene glycol N butyl ether | 0–8.4 |
| | b. Alkyloxy polyethyleneoxy ethanol (Tergitol 15-S-9) | 0–1.0 |
| | c. Isopropyl alcohol | 0–10.0 |
| | d. Dimethy Sulfoxide | |
| | e. N-Methyl Pyrrolidone | |
| | f. Other polyethylene or polypropylene glycols | |

The following examples are exemplary of the invention and should not be considered as limiting.

For all of the following examples, the L, a, b values are in the approximate range of L=80±10, a=32±5, b=36±9, where L, a, b are Hunter color coordinates.

The procedure for preparing the inks is as follows:

Equipment

1—Waring Commercial Blender
1—300 cc blender vessel with lid
1—Thermometer
1—1000 cc Vacuum flask
1—300 cc Filter set up
1—$2\mu$ Filter Absolute
1—Vacuum source
1—20 cc flat weighing container for toner/resins and dyes Procedure 1) Weigh all solvents in a Waring mixing blender vessel.
2) Weigh fluorescent pigment and yellow dye.
3) Place mixing vessel onto Waring Commercial blender, record the temperature of solvents at approximately 27° C., place lid on top of blender. Turn blender on low speed for 15 seconds.
4) Take lid off blender and pour toner/resins and dyes into blender. Then cover blender and put setting at high speed at 20,000 RPM.. Run at this speed for six minutes and record temperature, to approximately reach 45° C.
5) Allow ink to cool and reach room temperature. Then filter through vacuum set up. The solid filtrate will yield approximately 80 to 100 mg.

The procedure and equipment for testing the penetration time of the ink is as follows:

Equipment

3"×3" Lab Jack
Standard Pitney Bowes "C" envelopes or set of envelopes, conditioned at 26° C., 50 % relative humidity.
10 ul syringe
Ring Stand
Thermometer clamp
Stopwatch
Lint Free Towels
High Intensity Light Source Procedure 1. Clean the 10 ul syringe thoroughly.
2. Cut Pitney Bowes "C" envelopes into pieces approximately 3"×3".
3. Obtain ink samples to be tested (shake well if dispersion ink)
4. Secure the thermometer clamp onto the ring stand.
5. Draw approximately 10 ul of an ink sample into the syringe.
6. Carefully expel enough ink so as to have the volume in the syringe at the next lowest whole number of microliters (wipe excess ink from needle).
7. Secure syringe in the thermometer clamp, perpendicular to the clamp with the end of the syringe needle approximately 30° down from horizontal. Position the needle end approximately 4" above working surface.
8. Adjust the height of the lab jack to approximately 3". Place one piece of envelope paper from step 2 with the sample ID, "C envelope" or standard set of envelopes, and date written on it, onto the top surface of the lab jack.
9. Position the lab jack with the envelope piece under the needle end of the syringe.
10. Carefully dispense 1 ul of ink from the syringe so as to suspend a 1 ul drop from the bottom half of the needle tip.
11. Hold the stopwatch with one hand and use the other hand to slowly and carefully raise the lab jack.
   Raise the lab jack so the drop alone, and not the needle tip, just touches the envelope paper. As the drop makes contact with the envelope paper, start the stopwatch and simultaneously reverse the direction of the lab jack and lower it.
   Observe the drop on the paper closely and, and the instant the drop fully penetrates the paper (loss of gloss), stop the stopwatch.

It should be noticeable when the drop fully penetrates the envelope, because the shine on the surface of the test drop will diminish and disappear.

12. Record the time directly adjacent to the current test drop. If the time is 60 seconds or greater, record ">60".
13. Move the lab jack horizontally on the working surface to prepare to dispense the next test drop onto a randomly chosen, unused area of the envelope paper.
14. Repeat steps 10, 11, 12 and 13 until there are five randomly placed, valid test drops on the envelope paper.
15. Repeat procedure for each type of ink to be tested.

The procedure and equipment for testing the 45° waterfastness of the ink is as follows:

Equipment
1. Test Patterns
   a) Draw Down Pattern
2. Printer
3. Test Equipment
   a) PB Copy Paper
   b) Distilled Water
   c) Eye Dropper
   d) USPS PMU Meter (ModelLM-2C)
   e) Densitometer X-Rite 400B
   f) Scanner
   g) Test Envelopes
   h) 100 µl Syringe
   i) Draw Down Blade Procedure
1. Draw downs made on PB Copy Paper or envelope set. Envelope "C" preferred for screening test.
2. Prints should be allowed to dry for >3 hrs. at 22 C. and 35+/−5% relative humidity.
   Measure and record the PMU and optical density (OD) of the draw down.
3. Apply a drop, 100 ul, of water at 22 C. to ¼ from edge solid area.
4. Repeat sections 1–4.
5. Stand the envelope or copier paper on a 45° angle and run $H_2O$ down across draw down in at least three (3) places from top to bottom.
6. Allow the water to dry, >4 hours, in a dark area.
7. Measure, average and record the optical density of the draw down and the drain marks in the water marked areas. Measure the drain marks just below the last horizontal filled area.
8. Place the test samples in the record book for reference.

The procedure and equipment for testing the lightfastness on print samples is as follows:

Equipment
1. Printer
2. PB Copy Paper and/or Envelopes
3. Atlas HPUV Actinic Exposure System or equivalent
4. PMU Meter
5. Color spectrophotometer (optional)

Procedure
1. Obtain draw down on envelope set or white copier paper. Prints must be acceptable standard prints.
2. Determine the PMU of each print, and measure color if required.
3. Uncover the radiometer and turn both types of light on for 10–15 minutes. The On switch and both light buttons must be depressed to do this. The indoor timer must have some time to activate both lights (press the blue button). If the radiometer does not stay within 5%, wait 10 minutes. If the reading is still more than 5% off, something is not functioning. Otherwise continue:
4. Turn off the UV light and take the indoor radiometer reading. Then turn off the indoor light and take the UV light reading with the UV light on. COVER THE RADIOMETER WITH FOIL DURING TESTING, SINCE THE RADIOMETER IS NOT USED AFTER STARTUP.
5. The radiometer reads near 11.2 for indoor light only and 2.0 for UV light only.

|  | Reading | Time to simulate 1 day |
|---|---|---|
| Indoor Light | 11.2 | 21 minutes (0.3 hours) |
| UV Light | 2.0 | 14 minutes ON, 7 minutes OFF |

If the readings from 4. are not within 5%, you must recalculate the time to simulate a day (see 9.)

NOTE: Indoor light simulates indoor fluorescent lighting while UV light is daylight through a typical office window. Use of both is recommended for USPS testing. Twelve minutes of total testing equals to two days or 48 hours of actual exposure.

6. To set the indoor light timer, hold the blue button and set the test hours. To set the UV light cycle timer, hold SET1 and press the arrows to set ON time, and SET2 to set OFF time. The sum of UV light ON and OFF time should equal the total indoor time (all lights shut off when indoor timer finishes).
7. To start the test, turn both lights on. Hit the blue button on the indoor timer and the reset button under the UV light timer. Both timers should read the desired ON time. Expose 5 prints and/or draw downs to test and keep the six for reference. To simulate more than one day, reset both timers each time a simulated day has passed.
8. After each interval, determine and report PMU fluorescent intensity (and/or color) for the print or draw down.
9. The timing is calculated according to the following equation, with HP's table:

$HP$ units=(18.5)*(radiometer reading)

Testing hours=(table reading)*(16 hrs/day)/(4486 hrs/yr*3 yrs)

NOTE: The radiometer reading is different for indoor light and UV light—use attached table to determine test time to simulate 3 years (equation above calculates test time to simulate 1 day)

DO NOT LEAVE THE RADIOMETER OPEN DURING THE TEST, OR ITS LIFE WILL BE SHORT AND INACCURATE. COVER WITH ALUMINUM FOIL.

Results to be Reported
1. Report the print PMU and/or color and any observations. Compare to specifications.
2. Record the radiometer readings and the times for simulation.

To determine the effect and characteristic of capillary drying of inks

Equipment
1. Capillary glass tube(s) at 0.4 mm I.D., 75 mm in length

2. A vial or container to tape capillary tube(s) onto
3. Electrician's tape
4. Ruler or scale in mm
5. Filter paper, Whatman #1 or equivalent
6. Lint-free paper
7. Forced air circulating oven.

Procedure

1. Place one end of the capillary tube below the surface level of the ink and continue in and out of this level until 30 to 40 mm height is in the tube.
2. Wipe the excess ink on the outside of the tube with a lint-free towel.
3. Measure the length of the column of ink in the tube.
4. Place the tube vertically along the exterior surface of the vial with ink at bottom. Using electrical tape, cut a short section (15 mm) and place it at the middle of the tube and against the vial so the bottom of the tube doesn't touch the bench or table.
5. Label the vial with ink ID and date.
6. Place the vial with the tube of ink into the forced air oven at 50° C. and <10% relative humidity (RH) for at least 48 hours.
7. After the 48 hours or pre-determined time, remove vial with capillary and measure the length of ink in the tube.
8. Determine if the fluid in the capillary tube is still a liquid. This is done by tapping the tube against a filter paper which is placed on a smooth hard surface and observe if the ink flows out and leaves a spot on the paper.
9. Measure the length of fluid in tube and assemble tube and vial as stated in 4 and place it in the oven. Repeat 7. and 8. at period of time desired.

Results to be recorded

1. The number of hours or days the capillary tube remains a fluid at the tip should be recorded.
2. A plot of days in oven versus ink volume loss or ink volume length can be demonstrated provided more than three data periods are recorded.

The Procedure and Equipment to Determine the % Waterfastness Based Upon PMU Fluorescence 1. Equipment
1.1 50 ml of distilled water
1.2 A container with flat bottom to hold 50 ml of water.
1.3 A magnetic stirrer bar
1.4 A 50 ml graduated cylinder to measure liquid
1.5 An instrument to cut a paper inked draw down to the size of 20×26 mm.
1.6 X-Rite Densitometer and USPS Luminescence Meter, Model LM-2C (with a 1×25 mm window)
1.7 Stirrer
1.8 X-Rite Densitometer
1.9 USPS Luminescence Meter LM-2C
1.10 1×25 mm slot to fit into Meter LM-2C window
2. Procedure
2.1 From a Draw Down substrate, cut a 20×26 mm piece of such material to be used as a sample for the Water Fastness Test.
2.2 Take the draw down and measure the PMU (fluorescent intensity) with LM-2C Meter with 1×25 mm window.
2.3 Measure the optical density with X-Rite unit of the draw down.
2.4 Measure 50 ml of distilled water in the graduated cylinder. Subsequently, empty the 50 ml of distilled water from the graduated cylinder into the container (see Equipment No. 1.2).
2.5 In the same container of distilled water, place the magnetic stirrer and sample. If doing a number of samples, be sure each sample has its own container of distilled water and magnet stir bar. Also, do not contaminate the sample by placing any kind of marking (e.g., ink or pencil) for purposes of identification. Use discretion as to identifying the samples other than marking them.
2.6 Place the container(s) prepared in 2.3 on the Stirrer. Switch the Stirrer on and adjust its "Stir" control to a minimum setting whereby the magnet(s) in the container(s) are just beginning to move. Set the time clock for 5 minutes. At the end of the 5 minute period, remove the samples from their containers and place them on a paper towel for drying. Allow the samples to dry for 2 hours.
2.7 Using the X-Rite Densitometer, take and record a reading taken at the center of each sample. Before using the Densitometer, be sure that it is calibrated according to the instructions outlined in the Operation Manual.
2.8 Using the USPS Luminescence Meter, Model LM-2C and its 1×25 mm window, take and record the PMU reading. Also read the PMU with the full window.

The procedure for testing the contact angle of the ink is as follows:

The results from minute long tests of ink/paper substrate (envelope "C") contact angles are recorded. The initial contact angle values reported are angles taken within the first second of ink drop/ substrate contact. The other values are taken at 5 second time intervals after the ink drop was placed on the substrate. The contact angle for each ink on substrate decreases with time due to absorption of ink into the substrate. Repeat the above procedure a second time for a second run.

EXAMPLE 1

| Composition | WT % |
| --- | --- |
| 2-Pyrrolidinone | 16.9 |
| Triethylene Glycol Mono N Butyl Ether | 8.0 |
| Distilled Water | 59.4 |
| Basonyl Brilliant Yellow FF 4048 | 0.3 |
| Polyethylene Glycol 200 | 13.8 |
| Fluorescent Dimethyl Hydantoin Formaldehyde | 1.6 |

Properties on Georgia Pacific 20 lbs. basis weight #4 Xerographic Paper by Draw Down

| | |
| --- | --- |
| Peak of Emission Spectrum (nm) (After 254 nm excitation) | 591 |
| Fluorescent Intensity (Phosphor Meter Units) (measured with instrument proprietary to U.S. Postal Service with narrow window 1 × 25 mm) | 17 |
| Optical Density (X-Rite 400 Reflectance Densitometer) | 0.38 |

Waterfastness (after dipping test)

| | |
| --- | --- |
| Peak of Emission Spectrum (nm) | 594 |
| Fluorescent Intensity (Phosphor Meter Units) | 6.0 |

-continued

| | |
|---|---|
| (measured with instrument proprietary to U.S. Postal Service with narrow window 1 × 25 mm) | |
| Optical Density (bleeding part) | 0.34 |

Average penetration time for various envelopes of Example 1 ink in seconds

| Envelope Type | Penetration Time (Seconds) |
|---|---|
| A. White wove, 24, lb. low ink absorbing | 5.3 |
| B. White wove, 24 lb., high ink absorbing | 13.1 |
| C. 24 lb. Smooth finish | 34.3 |
| D. 24 lb. Classic laid finish | 68.7 |
| E. 9 × 12 32 lb., 90 clasp | 15.5 |
| G. Calendared paper stock | 52.5 |
| H. Air mail, #10 calendared matl. | 33.2 |
| I. Recycled paper stock | 10.1 |
| K. European market, DL | 46.2 |
| L. Recycled-Print Master No, 10 | 7.1 |
| R. Recycled | 10.3 |

Capillary Test

Remained liquid at tip of nozzle at 50° C. and <10% relative humidity (RH) after 7 days.

| | |
|---|---|
| % Waterfastness Test: | |
| Fluorescent Intensity (Phosphor Meter Units) | 29 PMU |
| (measured with instrument proprietary to U.S. Postal Service) with full window 20 × 26 mm) | |

Surface Tension 40.7 dynes/cm

Contact Angle Test on Envelope "C" with Example 1 Ink

| Time (Seconds) | Run No. 1 Angle (degrees) | Run No. 2 Angle (degrees) |
|---|---|---|
| Initial | 63.8 | 63.5 |
| 5 | 61.3 | 61.0 |
| 10 | 58.8 | 58.5 |
| 15 | 55.3 | 54.9 |
| 20 | 52.7 | 52.6 |
| 25 | 50.2 | 49.9 |
| 30 | 48.0 | 47.3 |
| 35 | 45.5 | 44.7 |
| 40 | 43.2 | 43.1 |
| 45 | 40.9 | 40.5 |
| 50 | 38.5 | 37.9 |
| 55 | 36.2 | 36.1 |
| 60 | 34.0 | 33.6 |

EXAMPLE 2

| Composition | WT. % |
|---|---|
| 2-Pyrrolidinone | 16.9 |
| Triethylene Glycol Mono N Butyl Ether | 8.0 |
| Distilled Water | 54.4 |
| Isopropyl Alcohol | 5.0 |
| Basonyl Brilliant Yellow FF 4048 | 0.3 |
| Polyethylene Glycol 200 | 13.8 |
| Fluorescent Dimethyl Hydantoin Formaldehyde | 1.6 |

Properties on Georgia Pacific 20 lbs. basis weight #4 Xerographic Paper by Draw Down

| | |
|---|---|
| Peak of Emission Spectrum (nm) | 591 |
| Fluorescent Intensity (Phosphor Meter Units) | 18 |
| (measured with instrument proprietary to U.S. Postal Service with narrow window 1 × 25 mm) | |
| Optical Density | 0.40 |

Waterfastness (after dipping test)

| | |
|---|---|
| Peak of Emission Spectrum (nm) | 594 |
| Fluorescent intensity (Phosphor Meter Units) | |
| (measured with instrument proprietary to U.S. Postal Service with narrow window 1 × 25 mm) | |
| Optical Density (bleeding part) | 0.37 |

Penetration Time

Penetration time of ink for type C envelope 24 seconds

Contact Angle Test on Envelope Type "C" with Example 2 Ink

| Time (Seconds) | Run No. 1 Angle (degrees) | Run No. 2 Angle (degrees) |
|---|---|---|
| Initial | 44.0 | 44.3 |
| 5 | 42.2 | 42.1 |
| 10 | 40.4 | 40.6 |
| 15 | 38.6 | 39.0 |
| 20 | 36.8 | 37.0 |
| 25 | 35.0 | 35.3 |
| 30 | 33.2 | 33.2 |
| 35 | 31.5 | 31.4 |
| 40 | 29.2 | 29.6 |
| 45 | 27.3 | 27.4 |
| 50 | 25.4 | 25.2 |
| 55 | 23.6 | 23.3 |
| 60 | 21.6 | 21.4 |

EXAMPLE 3

| Composition | WT. % |
|---|---|
| 2-Pyrrolidinone | 16.9 |
| Triethylene Glycol Mono-N Butyl Ether | 8.0 |
| Distilled Water | 59.15 |
| Alkyoxy polyethyleneoxy ethanol (Tergitol 15-S-9) | 0.25 |
| Fluorescent Dimethyl Hydantoin Formaldehyde | 1.6 |
| Basonyl Brilliant Yellow FF4048 | 0.3 |
| Polyethylene Glycol 200 | 13.8 |

Properties on Georgia Pacific 20 lbs. basis weight #4 Xerographic Paper by Draw Down

| | | |
|---|---|---|
| Peak of Emission Spectrum (nm) | | 591 |
| Fluorescent Intensity (Phosphor Meter Units) (measured with instrument proprietary to U.S. Postal Service with narrow window 1 × 25 mm) | | 21 |
| Optical Density | | 0.34 |

Penetration Time

Penetration time of ink for type C envelope 14 seconds

Capillary Test

Remained liquid at tip of nozzle at 50° C. and <10% relative humidity (RH) after 7 days.

Surface Tension 31.2 dynes/cm

Contact Angle Test on Envelope Type "C" with Example 3 Ink

| Time (Seconds) | Run No. 1 Angle (degrees) | Run No. 2 Angle (degrees) |
|---|---|---|
| Initial | 36.1 | 35.8 |
| 5 | 32.2 | 32.1 |
| 10 | 28.4 | 27.6 |
| 15 | 24.6 | 24.0 |
| 20 | 20.8 | 20.0 |
| 25 | 16.0 | 15.3 |
| 30 | 13.2 | 13.0 |
| 35 | 8.9 | 8.7 |
| 40 | 5.3 | 4.6 |
| 45 | 0.0 | 0.0 |
| 50 | 0.0 | 0.0 |
| 55 | 0.0 | 0.0 |
| 60 | 0.0 | 0.0 |

EXAMPLE 4

| Composition | WT. % |
|---|---|
| 2-Pyrrolidinone | 16.9 |
| Polyethylene Glycol 200 | 13.8 |
| Triethylene Glycol Mono-N Butyl Ether | 8.0 |
| Distilled Water | 54.15 |
| Fluorescent Dimethyl Hydantoin Formaldehyde | 1.6 |
| Brilliant Yellow FF4048 | 0.3 |
| Isopropyl Alcohol | 5.0 |
| Tergitol 15-S-9 | 0.25 |

Properties on Georgia Pacific 20 lbs. basis weight #4 Xerographic Paper by Draw Down

| | | |
|---|---|---|
| Peak of Emission Spectrum (nm) | | 591 |
| Fluorescent Intensity (Phosphor Meter Units) (measured with instrument proprietary to U.S. Postal Service with narrow window 1 × 25 mm) | | 18 |
| Optical Density | | 0.38 |

Waterfastness (after dipping test)

| | | |
|---|---|---|
| Peak of Emission Spectrum (nm) | | 594 |
| Fluorescent Intensity (Phosphor Meter Units) (measured with instrument proprietary to U.S. Postal Service with narrow window 1 × 25 mm) | | 6 |
| Optical Density (bleeding part) | | 0.32 |

Penetration Time

Penetration time of ink for type C envelope: 12 seconds

EXAMPLE 5

| Composition | WT. % |
|---|---|
| Distilled Water | 54.3 |
| 2-Pyrrolidinone | 16.90 |
| Polyethylene Glycol mol. Wt. 200 | 13.80 |
| Triethylene Glycol mono-n-butyl ether | 8.00 |
| Isopropyl alcohol | 5.00 |
| Tergitol 15-S-9 | 0.1 |
| Basonyl Brilliant Yellow FF4048 (Basic Yellow 40) | 0.3 |
| Fluorescent Dimethyl Hydration Formaldehyde | 1.6 |

Properties on Georgia Pacific 20 lbs. basis weight #4 Xerographic Paper by Draw Down

| | | |
|---|---|---|
| Peak of Emission Spectrum (nm) | | 591 |
| Fluorescent Intensity (Phosphor Meter Units) (measured with instrument proprietary to U.S. Postal Service with narrow window 1 × 25 mm) | | 20 |
| Optical Density | | 0.37 |

Waterfastness (after dipping test)

| | | |
|---|---|---|
| Peak of Emission Spectrum (nm) | | 594 |
| Fluorescent Intensity (Phosphor Meter Units) (measured with instrument proprietary to U.S. Postal Service with narrow window 1 × 25 mm) | | 6 |
| Optical Density (bleeding part) | | 0.34 |

Penetration Time

Penetration time of ink for type C envelope 19 seconds

EXAMPLE 6

| Composition | WT. % |
|---|---|
| Distilled Water | 53.4 |
| 2-Pyrrolidinone | 16.90 |
| Polyethylene Glycol mol. Wt. 200 | 13.80 |
| Triethylene Glycol mono-n-butyl ether | 8.00 |
| Isopropyl alcohol | 5.00 |
| Tergitol 1 5-S-9 | 1.0 |
| Basonyl Brilliant Yellow FF4048 (Basic Yellow 40) | 0.3 |
| Fluorescent Dimethyl Hydantoin Formaldehyde | 1.6 |

Properties on Georgia Pacific 20 lbs. basis weight #4 Xerographic Paper by Draw Down

| | | |
|---|---|---|
| Peak of Emission Spectrum (nm) | | 591 |
| Fluorescent Intensity (Phosphor Meter Units) (measured with instrument proprietary to U.S. Postal Service with narrow window 1 × 25 mm) | | 14 |
| Optical Density | | 0.37 |

Waterfastness (after dipping test)

| | | |
|---|---|---|
| Peak of Emission Spectrum (nm | | 594 |
| Fluorescent Intensity (Phosphor Meter Units) (measured with instrument | | 2 |

-continued

| | |
|---|---|
| proprietary to U.S. Postal Service with narrow window 1 × 25 mm) | |
| Optical Density (bleeding part) | 0.34 |

45° drain waterfast test on various envelopes of Example 6 ink

| Envelope Type | Back ground OD | After water OD 45° drain | After water OD 45° drain minus background OD |
|---|---|---|---|
| A. White wove, 24, lb. low ink absorbing | 0.09 | .13 | .04 |
| B. White wove, 24 lb., high ink absorbing | 0.08 | .12 | .04 |
| C. 24 lb. Smooth finish | 0.09 | .13 | .05 |
| D. 24 lb. Classic laid finish | 0.12 | .16 | .04 |
| E. 9 × 12 32 lb., 90 clasp | 0.40 | .42 | .02 |
| G. Calendared paper stock | 0.06 | .09 | .03 |
| H. Air mail, #10 calendared matl. | 0.16 | .20 | .04 |
| I. Recycled paper stock | 0.08 | .11 | .03 |
| K. European market, DL | 0.09 | .13 | .04 |
| L. Recycled-Print Master No, 10 | 0.08 | .11 | .03 |
| R. Recycled | 0.47 | .48 | .01 |

Average penetration time for various envelopes of Example 6 ink in seconds

| Envelope Type | Penetration Time (Seconds) |
|---|---|
| A. White wove, 24, lb. low ink absorbing | 5.3 |
| B. White wove, 24 lb., high ink absorbing | 10.0 |
| C. 24 lb. Smooth finish | 7.3 |
| D. 24 lb. Classic laid finish | 23.1 |
| E. 9 × 12 32 lb., 90 clasp | 8.1 |
| G. Calendared paper stock | 13.3 |
| H. Air mail, #10 calendared matl. | 65.2 |
| I. Recycled paper stock | 5.1 |
| K. European market, DL | 55.8 |
| M. Recycled-Print Master No, 10 | 3.8 |
| R. Recycled | 5.0 |

Capillary Test

Remained liquid at tip of nozzle at 50° C. and <10% relative humidity (RH) after 7 days.

% Waterfastness Test:

| | |
|---|---|
| Fluorescent Intensity (Phosphor Meter Units) (measured with instrument proprietary to U.S. Postal Service) with full window 20 × 26 mm) | 33 |

Surface Tension 30.8 dynes/cm

Contact Angle Test on Envelope Type "C" with Example 6 Ink

| Time (Seconds) | Run No. 1 Angle (degrees) | Run No. 2 Angle (degrees) |
|---|---|---|
| Initial | 18.1 | 19.2 |
| 5 | 15.2 | 16.1 |
| 10 | 12.4 | 12.6 |
| 15 | 10.6 | 10.0 |
| 20 | 7.8 | 8.0 |
| 25 | 6.0 | 5.3 |
| 30 | 0.0 | 0.0 |
| 35 | 0.0 | 0.0 |
| 40 | 0.0 | 0.0 |
| 45 | 0.0 | 0.0 |
| 50 | 0.0 | 0.0 |
| 55 | 0.0 | 0.0 |

EXAMPLE 7

| Composition | WT. % |
|---|---|
| Distilled Water | 57.15 |
| 2-Pyrrolidinone | 16.90 |
| Polyethylene Glycol mol. Wt. 200 | 13.80 |
| Triethylene Glycol mono-n-butyl ether | 8.00 |
| Isopropyl alcohol | 2.0 |
| Tergitol 15-S-9 | 0.25 |
| Basonyl Brilliant Yellow FF4048 (Basic Yellow 40) | 0.3 |
| Fluorescent Dimethyl Hydantoin Formaldehyde | 1.6 |

Properties on Georgia Pacific 20 lbs. basis weight #4 Xerographic Paper by Draw Down

| | |
|---|---|
| Peak of Emission Spectrum (nm) | 591 |
| Fluorescent Intensity (Phosphor Meter Units) (measured with instrument proprietary to U.S. Postal Service with narrow window 1 × 25 mm) | 14 |
| Optical Density | 0.38 |

Waterfastness (after dipping test)

| | |
|---|---|
| Peak of Emission Spectrum (nm) | 594 |
| Fluorescent Intensity (Phosphor Meter Units) (measured with instrument proprietary to U.S. Postal Service with narrow window 1 × 25 mm) | 1 |
| Optical Density (bleeding part) | 0.33 |

45° drain waterfast test on various envelopes of Example 7 ink

| Envelope Type | Back ground OD | After water OD 45° drain | After water OD 45° drain minus background OD |
|---|---|---|---|
| A. White wove, 24, lb. low ink absorbing | 0.09 | .12 | .03 |
| B. White wove,24lb., high ink absorbing | 0.08 | .11 | .03 |
| C. 24 lb. Smooth finish | 0.09 | .13 | .04 |

-continued

| Envelope Type | Back ground OD | After water OD 45° drain | After water OD 45° drain minus background OD |
|---|---|---|---|
| D. 24 lb. Classic laid finish | 0.12 | .15 | .03 |
| E. 9 × 12 32 lb, 90 clasp | 0.40 | .43 | .03 |
| G. Calendared paper stock | 0.06 | .10 | .04 |
| H. Air mail, 10 calendared matl. | 0.16 | .21 | .05 |
| I. Recycled paper stock | 0.08 | .11 | .03 |
| K. European market, DL | 0.09 | .13 | .04 |
| L. Recycled-Print. Master No, 10 | 0.08 | .11 | .03 |
| R. Recycled | 0.47 | .49 | .02 |

Average penetration time for various envelopes Example 7 ink in seconds

| Envelope Type | Penetration Time (Seconds) |
|---|---|
| A. White wove, 24, lb. low ink absorbing | 4.7 |
| B. White wove, 24 lb., high ink absorbing | 4.7 |
| C. 24 lb. Smooth finish | 10.1 |
| D. 24 lb. Classic laid finish | 9.2 |
| E. 9 × 12 32 lb., 90 clasp | 6.8 |
| G. Calendared paper stock | 8.0 |
| H. Air mail, #10 calendared matl. | 47.4 |
| I. Recycled paper stock | 3.6 |
| K. European market, DL | 30.2 |
| L. Recycled-Print Master No, 10 | 4.4 |
| R. Recycled | 3.1 |

Capillary Test

| Remained liquid at tip of nozzle at 50° C. and <10% relative humidity (RH) after 7 days. | 33 PMU |
|---|---|

% Waterfastness Test

| Fluorescent Intensity (Phosphor Meter Units) (measured with instrument proprietary to U.S. Postal Service with full window 20 × 26 mm) | 33 |
|---|---|

Surface Tension 31.4 dynes/cm

EXAMPLE 8

| Composition | WT. % |
|---|---|
| Distilled Water | 52.4 |
| 2-Pyrrolidinone | 16.9 |

-continued

| Composition | WT. % |
|---|---|
| Polyethylene Glycol mol. Wt. 200 | 13.80 |
| Triethylene Glycol mono-n-butyl ether | 8.00 |
| Isopropyl alcohol | 5.0 |
| Tergitol 15-S-9 | 0.20 |
| Basonyl Brilliant Yellow FF4048 (Basic Yellow 40) | 0.3 |
| Fluorescent Dimethyl Hydantoin Formaldehyde | 1.6 |

Properties on Georgia Pacific 20 lbs. basis weight #4 Xerographic Paper by Draw Down

| Peak of Emission Spectrum (nm) | 591 |
|---|---|
| Fluorescent Intensity (Phosphor Meter Units) (measured with instrument proprietary to U.S. Postal Service with narrow window 1 × 25 mm) | 15 |
| Optical Density | 0.36 |

Waterfastness (after dipping test)

| Peak of Emission Spectrum (nm) | 594 |
|---|---|
| Fluorescent Intensity (Phosphor Meter Units) (measured with instrument proprietary to U.S. Postal Service with narrow window 1 × 25 mm) | 4 |
| Optical Density (bleeding part) | 0.35 |

45° drain waterfast test on various envelopes of Example 8 ink

| Envelope Type | Back ground OD | After water OD 45° drain | After water OD 45° drain minus background OD |
|---|---|---|---|
| A. White wove, 24, lb. low ink absorbing | 0.09 | .10 | .01 |
| B. White wove, 24 lb., high ink absorbing | 0.08 | .10 | .02 |
| C. 24 lb. Smooth finish | 0.09 | .10 | .01 |
| D. 24 lb. Classic laid finish | 0.12 | .13 | .01 |
| E. 9 × 12 32 lb., 90 clasp | 0.40 | .43 | .03 |
| G. Calendared paper stock | 0.06 | .08 | .02 |
| H. Air mail, #10 calendared matl. | 0.16 | .18 | .02 |
| I. Recycled paper stock | 0.08 | .09 | .01 |
| K. European market, DL | 0.09 | .12 | .03 |
| L. Recycled-Print Master No, 10 | 0.08 | .09 | .01 |
| R. Recycled | 0.47 | .47 | 0 |

Penetration Time

Penetration time of ink of Example 8 for C envelope 11 seconds.

Capillary Test Remained liquid at tip of nozzle at 50° C. and <10% relative humidity (RH) after 7 days.

% Waterfastness Test

| | |
|---|---|
| Fluorescent Intensity (Phosphor Meter Units) (measured with instrument proprietary to U.S. Postal Service with full window 20 × 26 mm) | 63 |

EXAMPLE 9

| Composition | WT. % |
|---|---|
| Distilled Water | 49.4 |
| 2-Pyrrolidinone | 16.9 |
| Polyethylene Glycol mol. Wt. 200 | 13.80 |
| Triethylene Glycol mono-n-butyl ether | 8.00 |
| Isopropyl alcohol | 10.0 |
| Basonyl Brilliant Yellow FF4048 (Basic Yellow 40) | 0.3 |
| Fluorescent Dimethyl Hydantoin Formaldehyde | 1.6 |

Properties on Georgia Pacific 20 lbs. basis weight #4 Xerographic Paper by Draw Down

| | |
|---|---|
| Peak of Emission Spectrum (nm) | 591 |
| Fluorescent Intensity (Phosphor Meter Units (measured with instrument proprietary U.S. Postal Service with narrow window 1 × 25 mm) | 13 |
| Optical Density | 0.36 |

Waterfastness (after dipping test)

| | |
|---|---|
| Peak of Emission Spectrum (nm) | 594 |
| Fluorescent Intensity (Phosphor Meter Units (measured with instrument proprietary U.S. Postal Service with narrow window 1 × 25 mm) | 1 |
| Optical Density (bleeding part) | 0.35 |

45° drain waterfast test on various envelopes of Example 9 ink

| Envelope Type | Back ground OD | After water OD 45° drain | After water OD 45° drain minus background OD |
|---|---|---|---|
| A. White wove, 24, lb. low ink absorbing | 0.09 | .13 | .04 |
| B. White wove, 24 lb., high ink absorbing | 0.08 | .10 | .02 |
| C. 24 lb. Smooth finish | 0.09 | .10 | .01 |
| D. 24 lb. Classic laid finish | 0.12 | .15 | .03 |
| E. 9 × 12 32 lb., 90 clasp | 0.40 | .43 | .03 |
| G. Calendared paper stock | 0.06 | .07 | .01 |
| H. Air mail, #10 calendared matl. | 0.16 | .20 | .04 |
| I. Recycled paper stock | 0.08 | .10 | .02 |
| K. European market, DL | 0.09 | .11 | .02 |
| L. Recycled-Print Master No, 10 | 0.08 | .10 | .02 |
| R. Recycled | 0.47 | .48 | .01 |

Penetration Time

Penetration time of ink of Example 9 for C envelope 20 seconds.

Capillary Test

Remained liquid at tip of nozzle at 50° C. and <10% relative humidity (RH) after 7 days.

% Waterfastness Test

| | |
|---|---|
| Fluorescent Intensity (Phosphor Meter Units) (measured with instrument proprietary to U.S. Postal Service with full window 20 × 26 mm) | 38 |

Surface Tension 34.4 dynes/cm

EXAMPLE 10

| Composition | WT. % |
|---|---|
| Distilled Water | 51.87 |
| 2-Pyrrolidinone | 17.80 |
| Polyethylene Glycol mol. Wt. 200 | 14.60 |
| Triethylene Glycol mono-n-butyl ether | 8.40 |
| Isopropyl alcohol | 5.0 |
| Tergitol 15-S-9 | 0.25 |
| Basonyl Brilliant Yellow FF4048 (Basic Yellow 40) | 0.60 |
| Dantoin 739 (75% Resin in water) | 1.30 |
| Basonyl Red 560 (Basic Violet 11:1) | 0.18 |

Properties on Georgia Pacific 20 lbs. basis weight #4 Xerographic Paper by Draw Down

| | |
|---|---|
| Peak of Emission Spectrum (nm) | 590.5 |
| Fluorescent Intensity (Phosphor Meter Units (measured with instrument proprietary to U.S. Postal Service with narrow window 1 × 25 mm) | 9 |
| Optical Density | 0.28 |

Waterfastness (after dipping test)

| | |
|---|---|
| Peak of Emission Spectrum (nm) | 592.5 |
| Fluorescent Intensity (Phosphor Meter Units) (measured with instrument proprietary to U.S. Postal Service with narrow window 1 × 25 mm) | 1 |
| Optical Density (bleeding part) | 0.25 |

45° drain waterfast test on various envelopes of Example 10 ink

| Envelope Type | Back ground OD | After water OD 45° drain | After water OD 45° drain minus background OD |
|---|---|---|---|
| A. White wove, 24, lb. low ink absorbing | 0.09 | | |
| B. White wove, 24 lb., high ink absorbing | 0.08 | 0.10 | 0.02 |
| C. 24 lb. Smooth finish | 0.10 | 0.11 | 0.01 |
| D. 24 lb. Classic laid finish | 0.12 | 0.13 | 0.01 |
| E. 9 × 12 32 lb., 90 clasp | 0.42 | 0.42 | 0.00 |
| G. Calendared paper stock | 0.07 | 0.07 | 0.00 |
| H. Air mail, #10 calendared matl. | 0.17 | 0.18 | 0.01 |

| Envelope Type | Back ground OD | After water OD 45° drain | After water OD 45° drain minus background OD |
|---|---|---|---|
| I. Recycled paper stock | 0.09 | 0.09 | 0.00 |
| K. European market DL | 0.09 | 0.10 | 0.01 |
| L. Recycled-Print Master No, 10 | 0.09 | 0.09 | 0.00 |
| R. Recycled | 0.48 | 0.49 | 0.01 |

Average Penetration time for various envelopes of Example 10 ink in seconds

| Envelope Type | Penetration Time (Seconds) |
|---|---|
| A. White wove, 24, lb. low ink absorbing | 4.9 |
| B. White wove, 24 lb., high ink absorbing | 8.4 |
| C. 24 lb. Smooth finish | 13.1 |
| D. 24 lb. Classic laid finish | 7.1 |
| E. 9 × 12 32 lb., 90 clasp | 5.7 |
| G. Calendared paper stock | 7.7 |
| H. Air mail, #10 calendared matl. | 54.7 |
| I. Recycled paper stock | 4.0 |
| K. European market, DL | 32.3 |
| Recycled-Print Master No, 10 | 7.2 |
| R. Recycled | 4.7 |

Capillary Test

Remained liquid at tip of nozzle at 50° C. and <10% relative humidity (RH) after 7 days.

% Waterfastness Test

| | |
|---|---|
| Fluorescent Intensity (Phosphor Meter Units) (measured with instrument proprietary to U.S. Postal Service with full window 20 × 26 mm) | 35 |

EXAMPLE 11

| Composition | WT. % |
|---|---|
| Distilled Water | 48.95 |
| 2-Pyrrolidinone | 16.9 |
| Polyethylene Glycol mol. Wt. 200 | 13.8 |
| Triethylene Glycol mono-n-butyl ether | 8.0 |
| Isopropyl alcohol | 5.0 |
| Tergitol 15-S-9 | 0.25 |
| Basonyl Brilliant Yellow FF4048 (Basic Yellow 40) | 1.1 |
| Fluorescent Magenta Red Toner | 6.0 |

Properties on Georgia Pacific 20 lbs. basis weight #4 Xerographic Paper by Draw Down

| | |
|---|---|
| Peak of Emission Spectrum (nm) | 597.5 |
| Fluorescent Intensity (Phosphor Meter Units) (measured with instrument proprietary to U.S. Postal Service with narrow window 1 × 25 mm) | 25 |
| Optical Density | 0.61 |

Waterfastness (after dipping test)

| | |
|---|---|
| Peak of Emission Spectrum (nm) | 597 |
| Fluorescent Intensity (Phosphor Meter Units) (measured with instrument proprietary to U.S. Postal Service with narrow window 1 × 25 mm) | 4 |
| Optical Density (bleeding part) | 0.53 |

45° drain waterfast test on various envelopes of Example 11 ink

| Envelope Type | Back ground OD | After water OD 45° drain | After water OD 45° drain minus background OD |
|---|---|---|---|
| A. White wove, 24, lb. low ink absorbing | 0.09 | | |
| B. White wove, 24 lb., high ink absorbing | 0.08 | 0.09 | 0.01 |
| C. 24 lb. Smooth finish | 0.10 | 0.11 | 0.01 |
| D. 24 lb. Classic laid finish | 0.13 | 0.14 | 0.01 |
| E. 9 × 12 32 lb., 90 clasp | 0.43 | 0.43 | 0.00 |
| G. Calendared paper stock | 0.06 | 0.10 | 0.04 |
| H. Air mail, #10 calendared matl. | 0.17 | 0.23 | 0.06 |
| I. Recycled paper stock | 0.09 | 0.11 | 0.02 |
| K. European market, DL | 0.09 | 0.10 | 0.01 |
| L. Recycled-Print Master No, 10 | 0.09 | 0.11 | 0.02 |
| R. Recycled | 0.48 | 0.49 | 0.01 |

Average penetration time for various envelopes of Example 11 ink in seconds

| Envelope Type | Penetration Time (Seconds) |
|---|---|
| A. White wove, 24, lb. low ink absorbing | 10.0 |
| B. White wove, 24 lb., high ink absorbing | 4.3 |
| C. 24 lb. Smooth finish | 18.0 |
| D. 24 lb. Classic laid finish | 16.0 |
| E. 9 × 12 32 lb., 90 clasp | 10.2 |
| G. Calendared paper stock | 15.6 |
| H. Air mail, #10 calendared matl. | 52.8 |
| I. Recycled paper stock | 5.6 |
| K. European market, DL | 59.7 |

-continued

| Envelope Type | Penetration Time (Seconds) |
|---|---|
| L. Recycled-Print Master No, 10 | 9.4 |
| R. Recycled | 10.6 |

Capillary Test

Remained liquid at tip of nozzle at 50° C. and <10% relative humidity (RH) after 7 days.

% Waterfastness Test

| | |
|---|---|
| Fluorescent Intensity (Phosphor Meter Units) (measured with instrument proprietary to U.S. Postal Service with full window 20 × 26 mm) | 64 |

Surface Tension 33.5 dynes/cm

Contact Angle Test on Envelope Type "C" with Example 11 Ink

| Time (Seconds) | Run No. 1 Angle (degrees) | Run No. 2 Angle (degrees) |
|---|---|---|
| initial | 34.5 | 34.8 |
| 5 | 33.7 | 33.1 |
| 10 | 32.9 | 32.4 |
| 15 | 31.5 | 30.9 |
| 20 | 30.6 | 29.8 |
| 25 | 29.7 | 28.9 |
| 30 | 28.7 | 27.8 |
| 35 | 27.9 | 26.7 |
| 40 | 26.8 | 26.1 |
| 45 | 26.0 | 25.3 |
| 50 | 25.3 | 24.7 |
| 55 | 24.5 | 23.4 |
| 60 | 23.2 | 22.6 |

In examples 1–11 Basonyl Brilliant Yellow FF4048 was not purified. The aforementioned dye was purchased from BASF. The dye had: less than 2450 PPM concentration of phosphates; 100000 PPM concentration of sulfates; and less than 500 PPM of nitrates. The above concentrations were analyzed calorimetrically. The dye had: less than 2 PPM concentration of fluoride; less than 5 PPM concentration of chloride; less than 0.20 PPM concentration of bromide; and less than 0.1 PPM concentration of iodine. The above concentrations were analyzed by neutron activation.

The above embodiments have been given by way of illustration only, and other embodiments of the instant invention will be apparent to those skilled in the art, from consideration of the detailed description. Accordingly, limitation on the instant invention are to be found only in the claims.

What is claimed is:

1. A printing system having a printing mechanism for printing fast penetrating absorbing inks, the improvement comprising: a valve jet printing mechanism employing an aqueous waterfast fluorescent ink containing water, water soluble organic solvents, containing non purified dyes that have less than 2,450 ppm concentration of phosphates, 100,000 ppm concentration of sulfates, less than 500 ppm concentration of nitrates, less than 2 ppm concentration of fluoride, less than 5 ppm concentration of chloride, less than 0.20 concentration of bromide and less than 0.1 ppm concentration of iodine and a penetrating agent solvent system that contains isopropyl alcohol in combination with a surfactant that are inert to materials that comprise the printing mechanism.

2. The system of claim 1, wherein the ink may be used to produce tagger marks on paper.

3. The system of claim 2, wherein the fluorescent intensity is greater than 7 PMU for tagger marks having a 20×26 mm area.

4. The system of claim 1, wherein the printing mechanism is used in a postage meter.

5. The system of claim 1, wherein the printing mechanism is used in a mailing system.

6. The system of claim 1, wherein the alcohol and penetrant act synergistically to reduce penetration time of the ink.

7. The system of claim 1, wherein the surfactant is alkyloxy polyethylene oxyethanol.

8. The system claimed in claim 1, wherein the ink remains liquid at a tip of the valve jet after the printing mechanism has been shut down for extended times.

9. The system of claim 1, wherein the aqueous waterfast fluorescent ink composition consists essentially of:

a. 1.0–6.0 (Wt. %) clear resins and/or fluorescent toners;

b. 0.18–1.1 (Wt. %) dyes;

c. 48–57 (Wt. %) water;

d. 13.8–17.8 (Wt. %) of cosolvents; and e. 10.25–18.0 (Wt. %) of penetrants.

10. The composition claimed in claim 9, wherein the clear resins and fluorescent toners is selected from the group consisting of: dimethyl hydantoin formaldehyde polymer, and fluorescent dimethyl hydantoin formaldehyde.

11. The composition claimed in claim 9, wherein the dyes are selected from the group consisting of: Basonyl Red 560 (Basic Violet 11:1); and Basonyl Brilliant Yellow FF4048 (Basic Yellow 40).

12. The composition claimed in claim 9, wherein the cosolvents are selected from the group consisting of: 2-pyrrolidinone; polyethylene glycol average molecular weight 200; dimethyl sulfoxide, N-Methyl Pyrrolidone, other polyethylene or polypropylene glycols.

13. The composition claimed in claim 9, wherein the penetrants are selected from the group consisting of: Triethylene glycol N butyl ether, Alkyloxy polyethyleneoxy ethanol, and Isopropyl alcohol.

14. The system claimed in claim 1, wherein the penetrating agent solvent system has a vapor pressure between 5.9 and 11 mm/Hg.

15. The system claimed in claim 14, wherein Isopropl the vapor pressure of the Isopropyl alcohol is 31.2 mm at 20° C.

16. The system claimed in claim 9, wherein the ink has a surface tension between 30.8 and 40.7 dynes/cm.

17. The system claimed in claim 16, wherein the surface tension of the fluorescent ink is between 30.8 and 34.4 dynes/cm.

18. The system claimed in claim 1, wherein the penetrating agent solvent system has a boiling point of 170° C. and 204° C.

19. The system claimed in claim 1, wherein the isopropyl alcohol migrates instantaneously from an ink surface to an ink bulk making ink dynamic surface tension almost equal to static surface tension.

* * * * *